(12) United States Patent
Miller et al.

(10) Patent No.: US 8,591,600 B2
(45) Date of Patent: Nov. 26, 2013

(54) CO-EXTRUSION METHOD OF FABRICATING AN ELECTRODE STRUCTURE IN A HONEYCOMB SUBSTRATE

(75) Inventors: William James Miller, Horseheads, NY (US); Huan-Hung Sheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 1091 days.

(21) Appl. No.: 12/571,647

(22) Filed: Oct. 1, 2009

(65) Prior Publication Data

US 2010/0018053 A1  Jan. 28, 2010

Related U.S. Application Data

(62) Division of application No. 11/789,860, filed on Apr. 26, 2007, now abandoned.

(60) Provisional application No. 60/809,582, filed on May 30, 2006.

(51) Int. Cl.
    *H01G 9/00*  (2006.01)
(52) U.S. Cl.
    USPC .............. 29/25.03; 29/2; 29/592.1; 361/502
(58) Field of Classification Search
    USPC ........................ 29/2, 25.03, 592.1; 361/502
    See application file for complete search history.

(56) References Cited

U.S. PATENT DOCUMENTS

| 5,121,301 | A | * | 6/1992 | Kurabayashi et al. | 361/502 |
| 5,786,981 | A | | 7/1998 | Aoki et al. | 361/502 |
| 6,225,733 | B1 | | 5/2001 | Gadkaree et al. | 313/352 |
| 7,859,827 | B2 | * | 12/2010 | Bourcier et al. | 361/502 |
| 2009/0021890 | A1 | * | 1/2009 | Bourcier et al. | 361/502 |

FOREIGN PATENT DOCUMENTS

| JP | 2002033243 | 1/2002 | ............ H01G 9/016 |
| WO | WO98/22963 | 5/1998 | |
| WO | WO98/26439 | 6/1998 | ................ H01J 1/14 |

* cited by examiner

*Primary Examiner* — Carl Arbes
(74) *Attorney, Agent, or Firm* — Michael W. Russell

(57) ABSTRACT

A method for fabricating electrode structures within a honeycomb substrate having a plurality of elongated channels is provided that is particularly adaptable for producing an ultracapacitor. In this method, the nozzle of a co-extrusion device simultaneously feeds a current collector along a central axis of one of the channels while simultaneously injecting a paste containing an electrode material so that the interior of the channel becomes completely filled with electrode paste at the same rate that the current collector is fed. Such co-extrusion as performed simultaneously at both sides of the ceramic substrate to rapidly form electrode structures within substantially all the channels of the substrate. The resulting ultracapacitor is capable of storing large amounts of electrical energy per unit volume in a structure which is relatively quick and easy to manufacture.

16 Claims, 4 Drawing Sheets

CO-EXTRUSION METHOD OF FABRICATING AN ELECTRODE STRUCTURE IN A HONEYCOMB SUBSTRATE

This application is a divisional of U.S. application Ser. No. 11/789,860, filed Apr. 6, 2007, which claims the benefit of U.S. Provisional Application No. 60/809,582, filed May 30, 2006, entitled "Co-Extrusion Method of Fabricating Electrode Structures in Honeycomb Substrates and Ultracapacitor Formed Thereby."

FIELD OF THE INVENTION

This invention generally relates to ultracapacitor energy storage devices, and is particularly concerned with a method for forming electrode structures within the channels of a honeycomb substrate, and the ultracapacitor formed thereby.

BACKGROUND OF THE INVENTION

Electric double layered capacitors (EDLC), commonly known as ultracapacitors, are known in the prior art. Such devices are capable of storing larger amounts of electrical energy per unit volume than the traditional capacitors, generating much higher power in a short instant than many types of chemical batteries, and may be charged and discharged a large number of times with virtually no energy losses due to chemical reaction. Ultracapacitors having capacitances of thousands of Farads are already commercially available, and are being used as energy storage devices for providing back-up currents for microcomputers, clock radios, and other consumer electronics, as well as actuators or primary power sources capable of providing sufficient current for automobile engine cranking, as well as power sources for hybrid and electrical vehicles.

Such devices achieve their relatively high capacitances by virtue of a high-area electrode microstructure. In conventional capacitors, the electrodes are typically metallic plates separated by a dielectric material. As capacitance is dependent upon the area of the electrode, such plate-type electrode structures must be made very large to obtain capacitances in excess of one F. Ultracapacitors circumvent this limitation by means of electrodes formed from very fine, particulate materials, such as activated carbon, having surface area to mass ratios on the order of 1,000 to 3,000 $m^2/gm$. The resulting high surface area per unit volume that such electrode structures provide allow much higher capacitances to be stored in the resulting ultracapacitor than could possibly be stored in a capacitor using conventional, plate type electrodes.

In the simplest design of an ultracapacitor, two high-area electrodes are separated a short distance from one another via a dielectric material. Current collectors (which may be in the form of either wires or plates) are centrally provided within each of the particulate carbon electrode structures. The electrodes and the dielectric separating them are soaked in an electrolyte, which is preferably non-aqueous in order to avoid limitations on the charging voltage that are inherent with aqueous-type electrolytes. A charging voltage is then applied across the current collectors of the two opposing electrodes, which in turn allows a relatively large amount of positive and negative charges to migrate from the current collectors to the surfaces of the mutually contacting carbon particles forming the electrode structures. The charging process is complete when the capacitor is saturated. Electrical power may then be tapped from the current collectors as needed.

Unfortunately, such a simplistic, two-electrode carbon-based design does not yield efficient electrical power. While the power output may be increased by shortening the distance between the current collectors and the particulate carbon, the resulting lower volume of electrodes would of course reduce the available electrode area and hence the capacitance.

To overcome these limitations, ultracapacitors having multiple electrodes connected in parallel have been constructed. In one such design, an extruded honeycomb substrate formed from a conductive carbon-based material forms the first set of electrodes of the ultracapacitor, while monolithic carbon rods disposed in the hollow channels of the honeycomb structure form the other set of electrodes. To prevent short circuiting between the two sets of electrodes, the interior walls of the channels of the honeycomb structure are coated with a dielectric polymer film prior to the insertion or manufacture of the rod-like electrode structures within the honeycomb channels.

Because honeycomb substrate having relatively high channel densities of between 400 and 2,000 channels per square inch may be manufactured with existing extrusion technology, an ultracapacitor having hundreds or even thousands of electrodes are possible with this approach. The relatively small cross section where the cross sectional area of the resulting electrodes provides short distances between the centrally disposed current collectors, and the surrounding matrix of particulate carbon, allowing electrical charges to migrate to the surfaces of the particulate carbon with relatively small internal resistance, thereby resulting in an ultracapacitor that is chargeable within a matter of a few seconds, and which has a highly usable discharge energy.

Unfortunately, such honeycomb-type ultracapacitors have not yet realized their full potential in providing a low-cost, high energy storage device. It has been proven very difficult to install the rod-like, carbon electrode structures within the channels of the ceramic substrate. No practical and time-efficient method has yet been found to produce such rod-like electrode structures and to insert the hundreds or thousands required into the small, individual openings of the honeycomb channels. While extrusion techniques have been attempted, the small cross-sections of the channels and their close distances together has made it difficult to reliably and rapidly form electrode structures with current collectors within the channels without the formation of void spaces which compromises the performance and capacity of the resulting ultracapacitor. It has also proven difficult and time consuming to uniformly and reliably apply a coat of dielectric, insulating polymer over the interior walls of the hundreds or thousands of small channels within such honeycomb structures. Finally, the carbon based honeycomb substrates tend to be brittle and fragile, and thus prone to cracking or breakage during the installation of the rod-like electrode structures. The resulting cracks or other discontinuities create electrical leakages in the final ultracapacitor, which in turn degrade its performance.

Clearly, what is needed is an ultracapacitor capable of exploiting all the advantages of extruded honeycomb substrates without the accompaniment of any of the aforementioned disadvantages. In particular, a technique for manufacturing a honeycomb based ultracapacitor is needed wherein electrode structures are quickly and easily formed within each of the channels of the substrate without potentially wall-breaking forces and without the formation of performance compromising voids that reduce both energy and power performance. Ideally, the design of the honeycomb based ultracapacitor would obviate the need for coating the interior walls of the channels with a dielectric polymer. Finally, it would be desirable if the honeycomb substrate could be formed from a material stronger and more robust than carbon-based conductive compounds, and hence less apt to form internal cracks or other discontinuities that would compromise the performance of the final device.

SUMMARY OF THE INVENTION

Generally speaking, the invention is a method of fabricating electrode structures within the channels of honeycomb substrates that overcomes or at least ameliorates all of the aforementioned shortcomings associated with the prior art. To this end, the method comprises the steps of providing a honeycomb substrate having a plurality of channels, and then simultaneously feeding a current collector along a central portion of at least one of the channels while injecting a paste containing an electrode material such that the interior of the channel becomes completely filled with electrode paste at substantially the same rate that the current collector is fed into the channel. The electrode paste is preferably extrudable, and the current collector and electrode paste may be simultaneously fed into the channel of the substrate by the nozzle of a co-extrusion device by inserting the nozzle to the far end of the channel, and commencing the simultaneous feeding of the current collector and extrudable electrode paste from the nozzle while withdrawing the nozzle from the channel at a same rate that the current collector and extrudable electrode paste are fed.

The current collector may be, for example, a wire or strand formed from an electrically conductive metal or polymer. The electrode paste may include, for example, particulate carbon having a relatively high surface area per weight, e.g. 1,000-3,000 m$^2$/gm. Preferably, the dielectric honeycomb substrate may be of a form used in diesel particulate filters, wherein each of the elongated channels has a plugged end, and an open end, and wherein the plugging pattern on both ends of the substrate is a checkerboard pattern. Such a checkerboard plugging pattern not only provides an optimal distribution of three-dimensional interleaving electrode structures for ultracapacitator purposes, but further facilitates the simultaneous fabrication of an electrode structure in a plurality of channels that are all plugged at the same ends by allowing a wider spacing apart of the nozzles of a co-extrusion device than would otherwise occur if simultaneous co-extrusion were attempted within a plurality of mutually contiguous channels.

In a preferred embodiment of the method, two opposing arrays of co-extrusion nozzles are simultaneously inserted in all of the open ends of the channels on either end of the honeycomb substrate until the nozzles are adjacent to the plugged ends of the channels. All of the nozzles are then simultaneously actuated, and the two arrays of nozzles of the co-extrusion device are withdrawn as the current collectors and electrode paste are simultaneously extruded at such a rate that the channels become completely filled with electrode paste as the current collectors are fed along the central axis of the elongated channels. Extrusion of the electrode past ceases when the nozzles are withdrawn from the open ends of the channels. However, the feeding of the current collectors continues to provide a terminal portion of the current collector that extends out of each of the elongated channels of the substrate. The distal ends of the terminal portions are then cut, and all the terminal portions on either side of the honeycomb substrate are interconnected by means of collector plates.

The method is particularly adapted to forming an ultracapacitor having a high energy storage capacity per unit volume and a relatively low weight. The high processing speeds made possible by the inventive method and the use of low-cost materials advantageously result in a low-cost energy storage device. When the honeycomb substrate is formed from a dielectric ceramic material, the resulting structure is more robust than ultracapacitors utilizing a carbonaceous honeycomb substrate, and hence is less prone to breakage or manufacturing faults that can lead to power leakage during use. The co-extruded current collectors and electrode paste deposited within the channels of the dielectric ceramic substrate provides an electrode structure without the need for the deposition or coating of insulating films over the channel walls, and the terminal portions of the current collectors formed outside of the channels provides a convenient and robust means for interconnecting all of the electrodes on each side of the substrate via a conductive collector plate. Finally, the ability to manufacture channels in such ceramic honeycomb substrate having small cross sections (i.e., having a density of between 200 and 2,000 channels per square inch) provides an ultracapacitor which may be quickly charged, and which discharges at voltages comparable to those commonly associated with chemical batteries (i.e., between two and four volts).

BRIEF DESCRIPTION OF THE DRAWINGS

FIG. 1A is a perspective view of a dielectric ceramic honeycomb substrate that the method of the invention is preferably applied to;

DETAILED DESCRIPTION OF THE PREFERRED EMBODIMENT

Figure 1A:
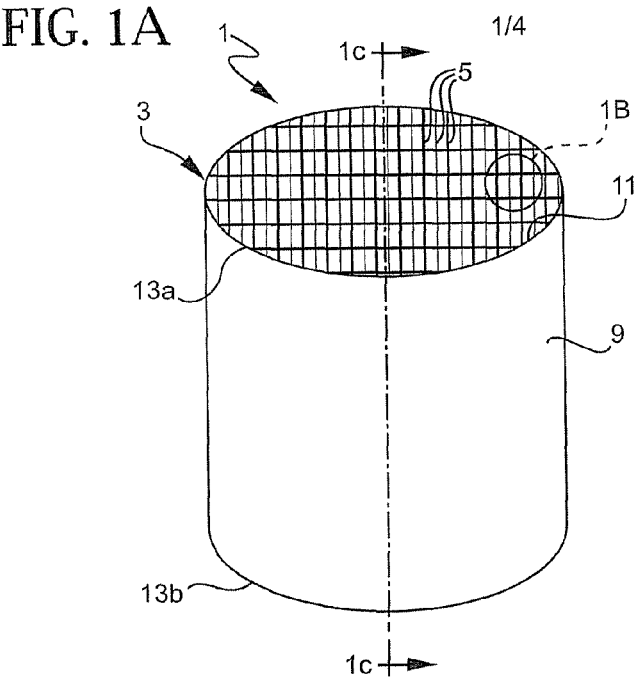
Figure 1B:
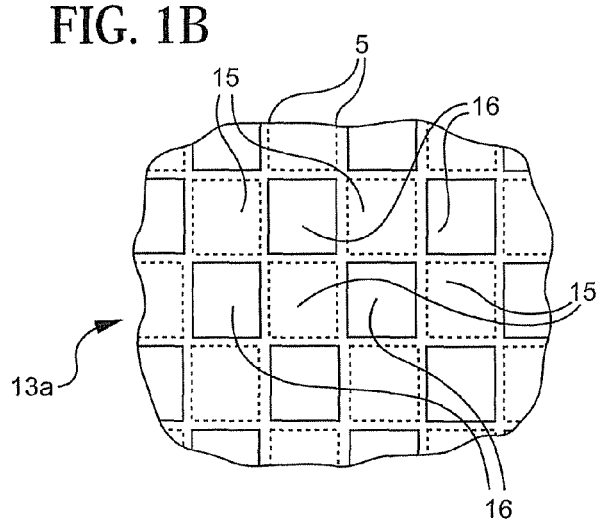
FIG. 1B is an enlargement of the circled portion of the top surface of the honeycomb substrate of FIG. 1A.
Figure 1C:
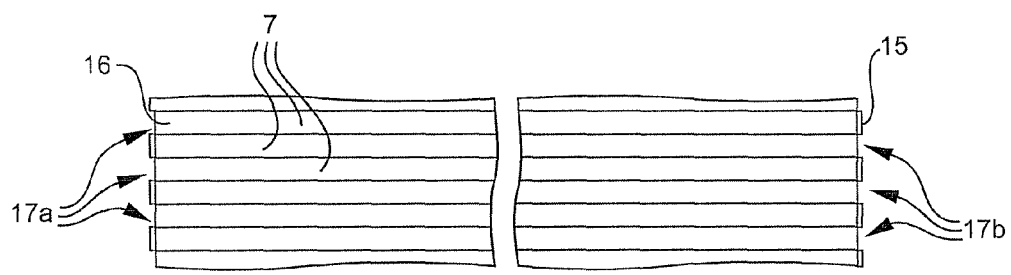
FIG. 1C is a partial, cross-sectional view of the honeycomb substrate illustrated in FIG. 1A along the line 1C-1C.

With reference to FIGS. 1A-1C, the invention is preferably applied to ceramic honeycomb substrates 1 of the type used as diesel particulate filters. Such substrates 1 include a network 3 of web walls 5 which define a plurality of elongated channels 7. While the channels 7 are illustrated as having a square cross-section in FIG. 1B, they may just as easily be hexagonal or some other polygonal shape. The web walls 5 forming the channels 7 are typically between 2.0 and 5.0 mils thick, and the density of the channels 7 may be between 300 and 2,000 channels per square inch. The ceramic substrate 1 further includes an outer skin 9 which is typically cylindrical in shape, and having a thickness of approximately three times that of the web walls 5. The network 3 of web walls 5 is integrally connected to the inner surface 11 of the outer skin 9. The honeycomb substrate 1 has generally planar opposing ends 13a, 13b as shown.

With particular reference to FIGS. 1B and 1C, the honeycomb substrate 1 that the method of the invention is preferably applied to is of the same structure as those presently used as diesel particulate filters. In such substrates 1, the open ends of the elongated channels 7 are plugged in a checkerboard pattern with integrally formed, plugs 15 such that each channel 7 has a plugged end, and an open end 16. The plugs 15 are preferably made from a non-conductive material, for example, glass, glass-ceramic, cement, or ceramic. Preferably the plug material will have CTE (coefficient of thermal expansion) similar to that of the honeycomb structure. The checkerboard plugging pattern creates two sets 17a, 17b of three-dimensionally, interleaved channels 7 which in turn may advantageously be used to form two sets of three-dimensionally interleaving electrode structures, as will be described hereinafter. While the method of the invention is applicable to honeycomb structures formed from carbonaceous or other conductive materials, it is more preferably applied to honeycomb structures formed from a dielectric ceramic material such as cordierite, mullite, silicon carbide, aluminum titanate, alumina and silicone alumina. As will be more appreciated hereinafter, the use of a ceramic dielectric material to form the honeycomb substrate 1 obviates the need for coating the inner walls of the channels 7 with insulating materials, and further facilitates the method of the invention by allowing the co-extrusion nozzles necessary to form the electrode substrates in situ within the elongated channels 7 to be spaced farther apart when the method is used to simultaneously form a plurality of electrode structures.

Figure 2A:
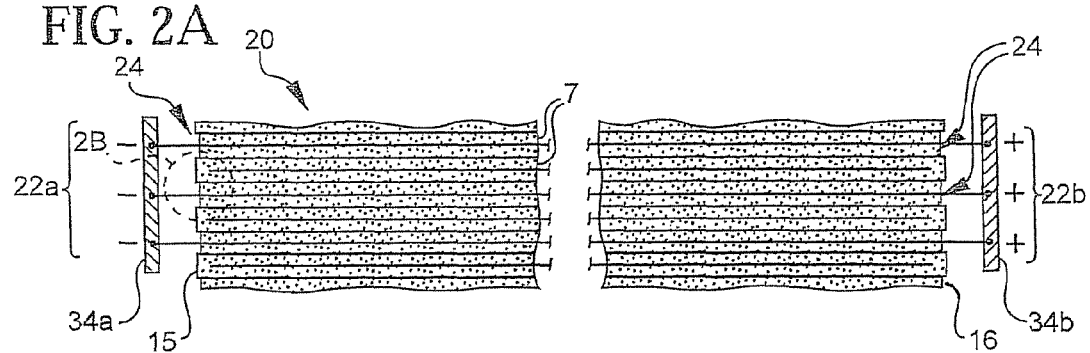
FIG. 2A is a partial cross-sectional view of a honeycomb substrate having electrode structures formed in its hollow channels via the method of the invention.
Figure 2B:
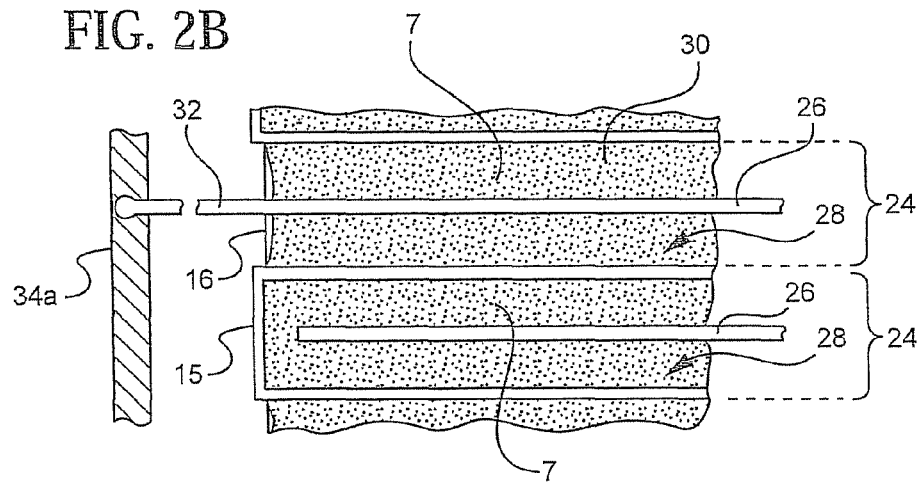
FIG. 2B is an enlargement of the circled portion of the partial cross-sectional view of the substrate in FIG. 2A.
Figure 2C:
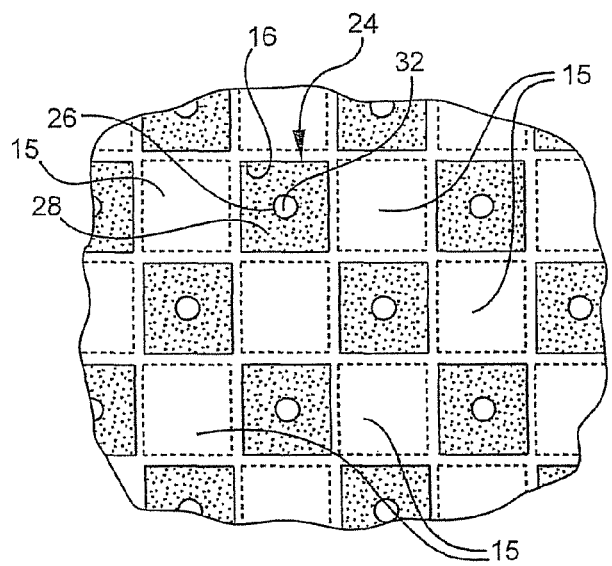
FIG. 2C is a partial end view of a honeycomb substrate having electrode structures formed in accordance with the method of the invention.

FIGS. 2A, 2B, AND 2C illustrate the structure of an ultracapacitor 20 after the method of the invention has been used to fabricate electrode structures within the channels 7 of the honeycomb substrate 1 illustrated in FIG. 1A. The resulting ultracapacitor 20 has two opposing sets 22a, 22b of electrode structures 24 disposed within the two opposing sets 17a, 17b of three-dimensionally, interleaving channels 7. Each electrode structure 24 includes a wire-like current collector 26 disposed along the longitudinal axis of its respective channel 7. The current collector 26 is completely surrounded by an electrode paste 28 that contains a particulate conductor 30 having a relatively high surface area per unit weight. An example of such a particulate conductor 30 is activated carbon having a surface area on the order of 2,000 $m^2/gm$. The particulate carbon is mixed with an inert, plastic polymer, such as polyvinylidene chloride, polyethylene tetrafluoride, and binder such as methylcel, etc., to render the carbon particles into a form which may be readily extruded, and which will form a solid structure within the channels 7 which will mechanically secure the current collectors 26.

As is shown in FIGS. 2A and 2B, each of the current collectors 26 of the electrode structures 24 ends in a terminal portion 32. The terminal portions 32 of each of the opposing sets 22a, 22b of electrode structures 24 are electrically connected by means of collector plates 34a, 34b so that all of the electrode structures 24 within each of the opposing sets 22a, 22b may be simultaneously charged and discharged. In the preferred embodiment of the ultracapacitor 20 of the invention, an electrode structure 24 is fabricated in all of the channels 7 of the honeycomb structure 1 with the exception of the partial channels formed at the interface between the web walls 5 and the inner surface 11 of the outer skin 9. After the two opposing sets 22a, 22b of electrode structures 24 are so formed, the resulting structure is soaked in a non-aqueous electrolyte such as tetraethyl ammonium tetrafluoraborate or lithium salts dissolved within a solvent such as acetonitrile and/or propylene carbonate. The structure 1 is appropriately packaged to prevent the electrolyte from evaporating. The use of a non-aqueous electrolyte advantageously increases both the charging and discharging voltage of the resulting ultracapacitor 20. It should be noted that the dielectric ceramic material that preferably forms with honeycomb substrate 1 is porous to allow absorption of the non-aqueous electrolyte within the web walls 5 forming the elongated channels 7. To this end, the porosity quotient of the dielectric ceramic material may be between about 20 and 60 percent.

Figure 3A:
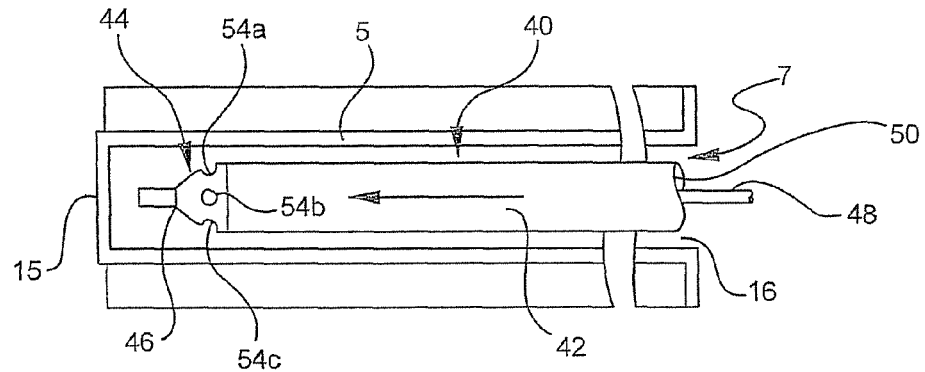
FIGS. 3A, 3B and 3C illustrate the formation of an electrode structure within a single channel of a ceramic honeycomb by a way of a co-extrusion nozzle in accordance with a method of the invention.
Figure 3B:
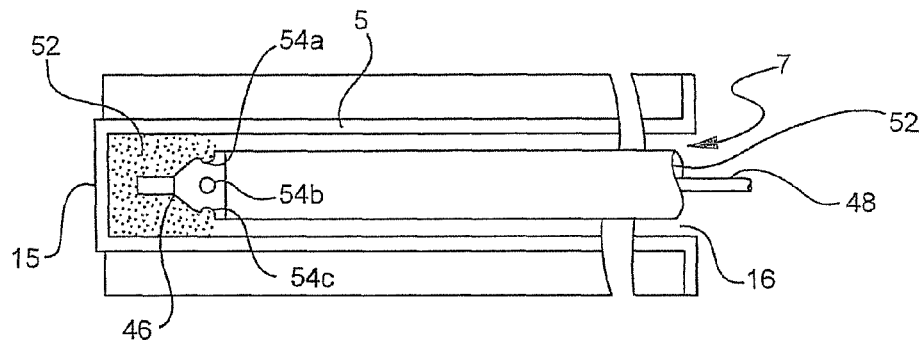
Figure 3C:
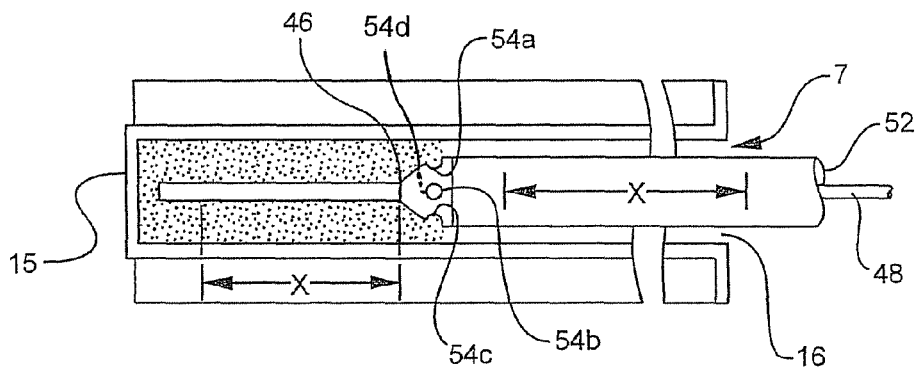

FIGS. 3A, 3B, and 3C illustrate the implementation of the method of the invention within the honeycomb substrate 1 to form the electrode structures 24 in the resulting ultracapacitor 20. In the first step of the method, a co-extrusion nozzle 40 is inserted through the open end 16 of the channel 7 all the way to a point closely adjacent to the (preferably ceramic) plug 15 at the opposite end of the channel 7. The co-extrusion nozzle 40 is formed from a tubular sleeve 42 that is substantially narrower than the cross section of width of the channel 7 so as to be easily inserted therein. The sleeve 42 terminates in a beveled or rounded tip 44 having a central opening 46 for guiding wire-like stock 48 that forms the previously described current collectors 26. Preferably, the wire-like stock 48 is made of a highly conductive and flexible metal material, such as copper wire that has been gold plated in order to render it corrosion resistant. However, other metals such as aluminum, nickel, titanium, tin, silver, platinum, and alloys thereof may also be used, as well as non-metallic, conductive plastic materials. The cross-sectional diameter of the wire-like stock 48 may range between 0.1 to 0.3 mm, depending upon the cross-sectional dimensions of the elongated channel 7. The interior 50 of the tubular sleeve 42 is hollow in order to conduct the previously discussed, extrudable electrode paste 52 from the screw feeder of a co-extrusion device through extrusion orifices 54a-54d located at the tip 44 of the co-extrusion nozzle 40.

After the co-extrusion nozzle 40 has been positioned toward the closed end of the channel 7 as illustrated in FIG. 3A, the co-extrusion device to which the co-extrusion nozzle 40 is connected is actuated in order to commence the extrusion of electrode paste 52 through the orifices 54a through 54d. This fills the closed end of the channel 7 with electrode paste 52, as is illustrated in FIG. 3B. Almost instantaneously, as is illustrated in FIG. 3C, the co-extrusion nozzle 40 begins to withdraw, and to feed the wire-like stock 48 that forms the current collector at a same rate that the extruded electrode paste 52 fills the interior of the channel 7. In other words, for every length "X" that the electrode paste 52 fills within the channel 7, a length "X" of wire-like current collector stock is fed through the central opening 46 of the tip 44 of nozzle 40. The feed rate of the extrudable electropaste 52 and wire-like stock 48 is maintained in this manner as co-extrusion nozzle 40 is withdrawn from the channel 7 until the tip 44 of the nozzle 40 reaches the open end 16, whereupon the feeding of the extrudable electrode paste 52 is stopped. However, the wire-like stock 48 continues to be fed in order to form the previously described terminal portion 32 of the resulting current collector 26, whereupon the feeding of the wire-like stock 48 stops. The stock 48 is then cut in order to complete the formation of an electrode structure 24 within the elongated channel 7. While the method has been described in terms that imply that the co-extrusion nozzle 40 is withdrawn through the open end 16 of the channel 7 while the substrate 1 remains stationary, the method may just as easily be implemented by maintaining the co-extrusion nozzle stationary 40 while withdrawing the honeycomb substrate away from it. All such forms of relative motion are encompassed within the method of the invention.

Figure 4:
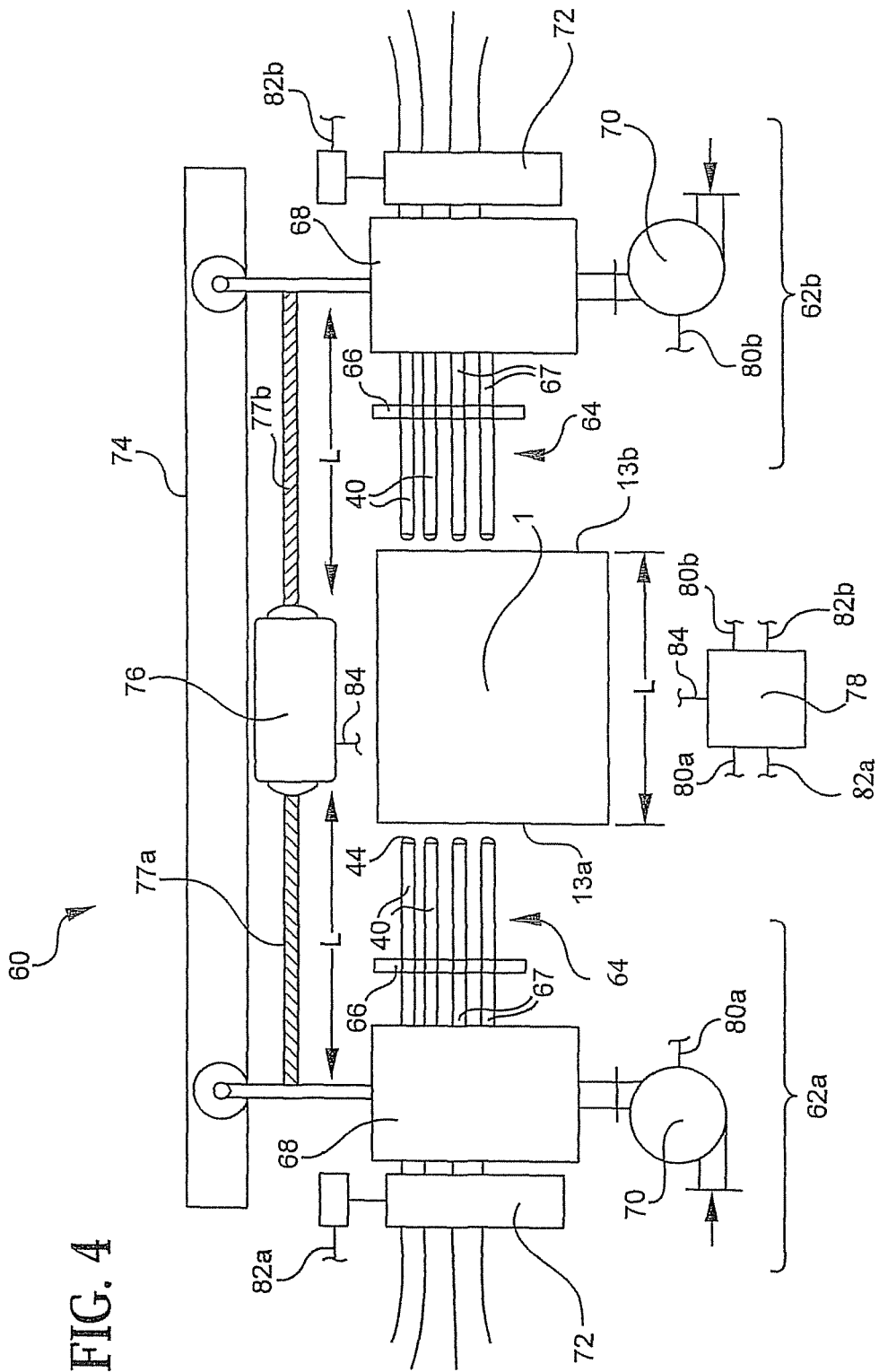
FIG. 4 is a schematic diagram of a co-extrusion device for implementing the preferred method of the invention.

FIG. 4 illustrates a co-extrusion device 60 that may be used in implementing a preferred embodiment of the method of the invention. Device 60 includes a pair of opposing co-extrusion assemblies 62a, 62b. Each of these assemblies includes a nozzle array 64 formed from co-extrusion nozzles 40 which are arranged, via a supporting guide plate 66, into a pattern which registers with the "checkerboard" pattern of channel open ends 16 of one of the opposing sets 17a, 17b of the three-dimensionally, interleaved channels 7 described with respect to FIGS. 1B and 1C. The base ends 67 of each of the co-extrusion nozzles 40 are mounted in the manifold 68. The manifold 68 is in turn connected to a screw feeder 70 for feeding electrode paste 52 through the hollow interiors 50 of the co-extrusion nozzles 40 at a selected rate. The manifold 68 is further connected to a wire feed mechanism 72 which, like the screw feeder 70, is capable of feeding the current-collector forming stock 48 at a selected rate through the central openings 46 of the tips 44 of each of the co-extrusion nozzles 40. Each of the co-extrusion assemblies 62a, b is slidably mounted on a support frame 74 so that their respective nozzle arrays 64 may be reciprocably inserted into the checkerboard patterns of channel open ends 16 of the honeycomb substrate 1, and Original therefrom. Each of the co-extrusion assemblies 62a, 62b is connected to a drive mechanism 76 having lead screws 77a, b, each having a length L, for inserting and withdrawing the nozzle array 64 of each of the assemblies 62A, 62B at a selected, steady rate. Finally, the co-extrusion device 60 includes a control mechanism in the form of digital processor 78 which is connected to screw feeder control wires 80a, 80b; wire feeder control wires 82a, 82b and drive motor control wire 84.

In operation, a honeycomb substrate 1 is placed between the opposing nozzle arrays 60 of the two co-extrusion assemblies 62a, b as shown in FIG. 4 such that the tips 44 are aligned with the checkerboard pattern of open ends 16 of the channel 7 present on the ends 13a, 13b of the substrate 1. Following such alignment, the digital processor 78 actuates the motor of the drive mechanism 76 to insert the nozzle array 64 of each of the two opposing co-extrusion assemblies 62a, b so that the tips 44 of the nozzles 40 are adjacent to the ceramic plugs 15 disposed at the ends of each of the two sets 17a, 17b of channels 7. The digital processor 78 then actuates the screw feeders 80 and the wire feeders 82 of each of the co-extrusion assemblies 62a, b as well as the drive mechanism 76. The digital processor 78 coordinates the rate of feed of the screw feeder 80, the wire feeder 82, and the withdrawal rate of the nozzle array 64 of the co-extrusion assemblies 62a, b to simultaneously implement the electrode structure forming process for each channel 7 in accordance with the description given with respect to FIGS. 3A-3C.

We claim:

1. A method for fabricating an electrode structure within channels of a honeycomb substrate, said method being particularly adapted for producing an ultracapacitor, and comprising the steps of:
   providing a honeycomb substrate having a plurality of channels,
   simultaneously feeding a current collector along a central portion of at least one of said channels while injecting a paste containing an electrode material such that the interior of said channel becomes completely filled with said electrode paste at substantially a same rate that said current collector is fed into said channel, wherein said electrode paste is extrudable, and said current collector and said electrode paste are simultaneously fed into said channel by the nozzle of a co-extrusion device,
   inserting said nozzle of said co-extrusion device to one end of said channel, commencing the feeding of said current collector and extrudable electrode paste from said nozzle, and withdrawing said nozzle from said channel at a same rate that said current collector and said extrudable electrode paste are fed into said channel, and
   plugging one end of said channel and inserting said nozzle into an opposite, unplugged end prior to commencing the feeding of said current collector and extrudable electrode paste, wherein said co-extrusion device has a plurality of nozzles, each of which is simultaneously inserted, and simultaneously actuated to feed said current collector and extrudable electrode paste into its respective channel, and then simultaneously withdrawn, such that an electrode structure is simultaneously produced in a plurality of channels.

2. The method defined in claim 1, wherein said current collector is a wire formed from an electrically conductive material.

3. The method defined in claim 1, wherein the electrode paste includes particulate carbon.

4. The method defined in claim 1, wherein the honeycomb structure is formed from a dielectric and thermally stable ceramic material.

5. The method defined in claim 1, wherein said co-extrusion device has first and second sets of nozzles disposed on opposite sides of said honeycomb substrate, the total number of nozzles being the same or nearly the same as the total number of channels in the honeycomb substrate, and wherein said first and second sets of nozzles are simultaneously inserted, actuated, and withdrawn such that an electrode structure is simultaneously formed in substantially all of the channels.

6. The method defined in claim 1, wherein the honeycomb substrate is formed from one of the group consisting of cordierite, mullite, aluminum titanate, silicon carbide, alumina and silicone alumina.

7. A method for forming electrode structures within a dielectric honeycomb substrate, said method being particularly adapted for producing an ultracapacitor, and comprising the steps of:
   providing a honeycomb substrate having a plurality of elongated channels, and
   simultaneously feeding a wire-like current collector along a central axis of at least one of said channels while injecting a paste containing an electrode material such that the interior of the channel becomes completely filled with said electrode paste at a same rate that said current collector is fed into said channel.

8. The method defined in claim 7, wherein said electrode paste is extrudable, and said wire-like current collector and said electrode paste are simultaneously fed into said channel by the nozzle of a co-extrusion device.

9. The method of claim 7, wherein the electrode paste includes activated particulate carbon.

10. The method of claim 9, wherein the surface area of the activated particulate carbon is between about 1000 to 3000 m²/gm.

11. The method of claim 7, wherein the current collector is a wire formed from a conductive metal.

12. The method of claim 7, wherein the current collector is a wire having a diameter of between about 0.10 and 0.30 mm.

13. The method of claim 8, further including the step of plugging one end of said at least one channel and inserting said nozzle into an opposite, unplugged end prior to commencing the feeding of said current collector and extrudable electrode paste.

14. The method of claim 8, wherein said co-extrusion device has a plurality of nozzles, each of which is simultaneously inserted, and simultaneously actuated to feed said current collector and extrudable electrode paste into its respective channel, and then simultaneously withdrawn, such that an electrode structure is simultaneously produced in a plurality of channels.

15. The method of claim 14, wherein said co-extrusion device has first and second sets of nozzles disposed on opposite sides of said ceramic honeycomb structure, the total number of nozzles being the same or nearly the same as the total number of channels in the ceramic substrate, and wherein said first and second sets of nozzles are simultaneously inserted, actuated, and withdrawn such that an electrode structure is simultaneously formed in substantially all of the channels.

16. The method of claim 7, wherein the channel density of said honeycomb substrate is between about 400 and 2000 per square inch.

* * * * *